Jan. 24, 1967  J. R. MATTHEWS  3,300,288
METHOD FOR THE PRODUCTION OF GLASS FIBERS
Filed Oct. 22, 1965
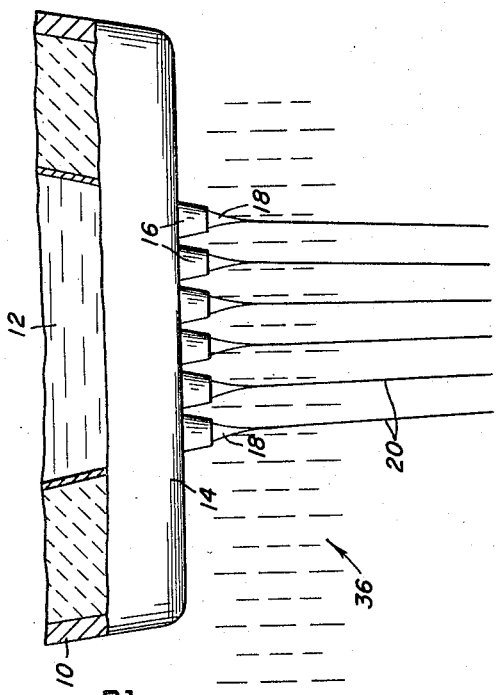
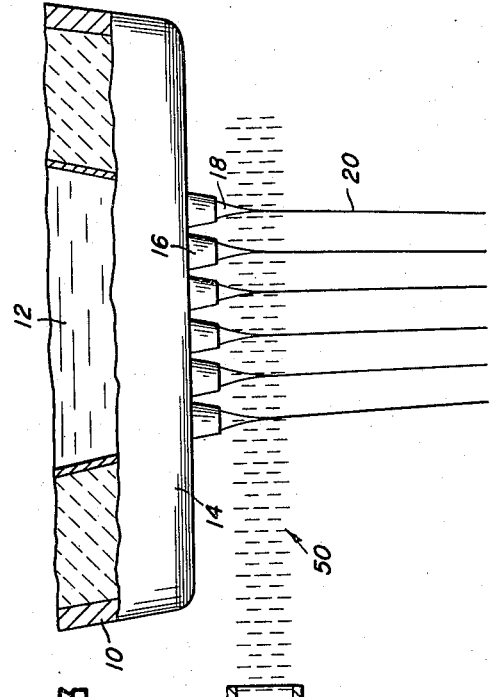
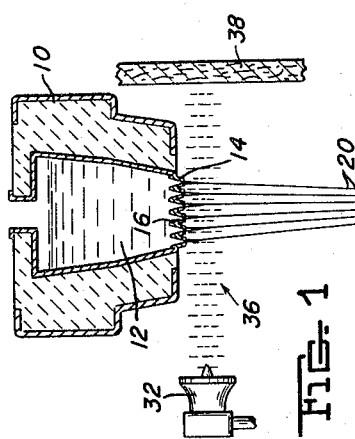
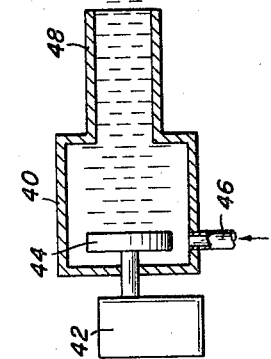
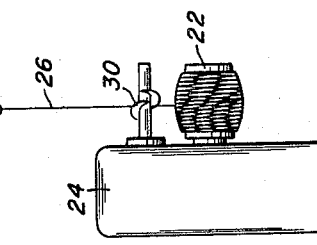
INVENTOR
JACK R. MATTHEWS
By Oscar L. Spencer
Attorney

United States Patent Office 3,300,288
Patented Jan. 24, 1967

3,300,288
METHOD FOR THE PRODUCTION OF
GLASS FIBERS
Jack R. Matthews, Allison Park, Pa., assignor to Pittsburgh Plate Glass Company, Pittsburgh, Pa., a corporation of Pennsylvania
Filed Oct. 22, 1965, Ser. No. 502,220
4 Claims. (Cl. 65—2)

This application is a continuation-in-part of my copending application, Serial No. 261,994, filed March 1, 1963, entitled, "Method and Apparatus for the Production of Glass Fibers" now abandoned.

This invention relates to improvements in the production of fibers from heat softenable materials and more particularly to improvements in the method for cooling the cones of molten material from which fibers are being continuously drawn.

The invention hereinafter described has particular utility with the production of continuous glass fibers. The conventional process for continuously producing glass fibers most commonly used in the United States involves drawing a number of individual glass fibers from an electrically heated platinum alloy bushing associated with a refractory furnace containing a molten supply of glass. The bushing has a plurality of depending tips defining orifices through which the glass issues as molten streams. The molten streams flowing from the orifices neck down and from inverted cones of molten glass. The individual fibers are drawn from the cones of molten glass at a high rate of speed and are grouped into a strand as they pass over a suitable guide. The strand is thereafter wound on a rapidly rotating forming tube. The rotation of the forming tube provides the pulling force for attenuating the fibers.

It has been found advantageous to heat the glass in the bushing to a relatively high temperature so as to produce fibers of great homogeneity. However, because of the relative location of the bushing and the cones of glass from which the fibers are drawn, heat is radiated from the bushings to the cones of glass. The temperature of the molten glass in the cones is raised by the heat radiated from the bushings so that the viscosity of the glass in the cones is lowered when the glass in the bushings is heated to a relatively high temperature. When the viscosity in the molten glass cones is too low, the cones have a tendency to constrict into droplets instead of flowing as a continuous stream. When heated bushings are employed, it has been found necessary for proper fiber formation to extract heat energy from the molten cones of glass. The cooling of the molten cones of glass increases the viscosity of the molten glass cones and thereby eliminates constriction of the cones and droplet formation. One of the principal difficulties encountered in cooling the glass cones is to control the cooling rate so that the temperature and viscosity of the molten glass cones remains substantially constant.

It is well known to provide means for extracting heat energy from the cones of glass from which the fibers are drawn. Examples of such teachings can be found in the patents to Kleist et al. #2,121,802 and Russell #2,908,036. Kleist discloses apparatus that includes a pressure chamber and a nozzle surrounding the fiber as it is being attenuated. Air or steam under pressure is directed through the chamber and outlets in the nozzle toward the fiber. The steam or air is impinged against the fiber as it is being drawn and cools the fiber while the fiber is passing through the annealing temperature ranges. The cooling apparatus in Kleist surrounds the semimolten fiber and if the fiber in its semimolten state touches the surrounding apparatus, the fiber breaks and production is interrupted. The cooling apparatus disclosed in Kleist et al. is positioned well beneath the cone of molten glass and does not serve to effectively cool or control the viscosity of the molten glass cone.

Russell #2,908,036 discloses apparatus for cooling the cones of molten glass by means of fins positioned between the rows of cones formed on the bottom wall of the bushing. The fins in Russell in addition to extracting heat from the cones of molten glass, extract heat from the heated bushing so that the fins cool both the cones of molten glass and the underside of the bushing. As above discussed, it is undesirable to cool the bushing since heat energy is supplied thereto to heat the glass in the bushing to a relatively high temperature. Heat removal from the bushing reduces the tip temperature and increases glass viscosity. An increase in glass viscosity reduces glass throughput and introduces undesirable fiber drawing tensions due to these added viscous forces. To compensate for the reduced throughput, additional electrical energy is supplied to the bushing and feeder. This additional electrical energy results in a greater amount of radiant energy being emitted from the bottom of the bushing. This increased radiant energy under certain conditions causes the fibers to part because of the intense heat present in the area where the fibers are being drawn from the molten glass cones.

The cooling apparatus disclosed in the prior art does not provide a constant controlled cooling rate for the cones of molten glass. The atmosphere surrounding the cones of molten glass is at an elevated temperature and contains volatiles from the molten glass. These glass volatiles condense upon and adhere to the cooling apparatus positioned in the vicinity of the molten glass cones and accumulate thereon. Air-borne dust particles are also present in the atmosphere surrounding the cones of molten glass and are also deposited with the glass volatiles on the cooling apparatus. The deposit of the glass volatiles and dust particles on the cooling apparatus changes the rate of heat transfer between the molten glass cones and the cooling apparatus and initiates chemical corrosion of the cooling apparatus. The change in the rate of heat transfer requires continued temperature adjustments of the heated bushing to maintain a uniform diameter product. After approximately a week of operation, the fins of Russell must be removed and the foreign material cleaned from the surfaces. This results in frequent down time in production to clean and replace the cooling apparatus. It is readily apparent the use of cooling apparatus within close proximity of the heated bushing and the molten glass cones requires continuous maintenance and control.

Even when fin type heat exchangers are used, it has been observed by thermocouple measurements in the vicinity of the molten glass cones that there are random continuous temperature variations of 200° F. or higher over relatively short time intervals. The cooling of the molten glass cones is dependent to a great extent on the surrounding air, especially the air currents present during the drawing process. It has been found when the drawing process is interrupted, air temperatures in the vicinity of the orifices may rise as much as 600° F.

According to the present invention, which overcomes the difficulties of the prior art, a process is provided for cooling the cones of molten glass without positioning the cooling means in the immediate proximity of the molten glass cones. The cooling rate is maintained substantially constant and effective control and stability of the cooling means is obtained.

In the production of glass fibers the under side of the electrically heated bushing is exposed to the surrounding air. The molten cones of glass are, therefore, each surrounded by a fluid medium which is, in this instance, air.

The air is in heat exchange relation with the molten glass cones and serves to cool the molten glass cones by convection. There are random air currents within the vicinity of the molten glass cones. The air is circulated by the fiber as the fiber is attenuated and the air is also heated by the bushing and circulates by natural convection. It is apparent, therefore, that the convective heat transfer between the molten glass cones and the surrounding air is uncontrolled and the heat transfer relies principally on natural convective currents. Other than the above discussed random air currents, the air surrounding the molten glass cones is in a relatively quiescent state so that the heat transfer from the molten glass cones to the surrounding air is limited to a rate comparable with that of natural convection between a fluid and a solid. It is well known that, as is common in natural convection, a boundary film of air forms about the molten glass cones. The boundary film of air acts as an insulating means and limits the rate of heat transfer between the molten glass cones and the surrounding air. It has been discovered that it is now possible through thermo acoustic transduction to subject the air to controlled vibrations at a frequency and amplitude which increases the heat transfer between the molten glass cones and the surrounding air. The vibrations further control the random air currents to an extent that there is now positive control and stability of the cooling media. The vibrations produce an acoustic field or acoustic currents which interact with the thermal field or convective currents to increase the rate of heat transfer between the air and the molten glass cones. This interaction will hereinafter be termed thermo acoustic streaming or thermo acoustic transduction. It is believed the thermo acoustic streaming subjects the boundary film of air surrounding the molten glass cones to a controlled turbulence which, in effect, removes the quiescent boundary film of air and continually replaces the air film surrounding the molten glass cones to thereby increase the heat transfer between the molten glass cones and the surrounding air. In effect, the air surrounding the cones of molten glass which in the past relied upon natural convection for heat transfer is now subjected to a type of forced convection due to the intense acoustic field or acoustic currents. The intense acoustic field further stabilizes the air surrounding the cones of molten glass in that the cones are not subjected to the previously discussed random air currents which resulted in uneven and uncontrolled cooling of the molten glass cones. The advantages of the stability and control of the cooling means will be readily apparent.

Briefly, the invention includes subjecting the air surrounding the molten glass cones to controlled vibrations above a particular intensity. The vibrations produce an acoustic field or acoustic currents which interact with the convective air currents to increase the rate of heat transfer between the molten glass cones and the surrounding air.

To accomplish the above objective, an acoustic generator is positioned laterally of the molten glass cones in substantially the same horizontal plane with the molten glass cones. The acoustic generator is spaced from the molten glass cones a sufficient distance that it is not subjected to the intense heat of the electrically heated bushing nor to the glass volatile contaminants. The acoustic generator when energized emits an intense acoustic field which encompasses the molten glass cones. The acoustic field interacts with the air surrounding the molten glass cones and effectively cools the molten glass cones by means of thermo acoustic transduction.

Accordingly, the principal object of this invention is to provide an improved method for cooling the molten glass cones during the production of glass fibers.

Another object of this invention is to increase the rate of heat transfer between the molten glass cones and the surrounding air by thermo acoustic transduction.

Another object of this invention is to cool the molten glass cones during the attenuation of glass fibers therefrom without positioning cooling apparatus adjacent the molten glass cones.

These and other objects and advantages of this invention will be more completely disclosed and described in the following specification, the accompanying drawings and the appended claims.

In the drawings:

FIGURE 1 is a view in side elevation of apparatus used in a glass fiber forming process and including the cooling means of the present invention.

FIGURE 2 is an enlarged view in side elevation of the electrically heated bushing and the molten glass cones illustrated in FIGURE 1.

FIGURE 3 is another view in side elevation similar to FIGURE 2 illustrating another arrangement for providing an intense acoustic field in the vicinity of the molten glass cones.

Referring to the drawings there is shown a glass melting furnace 10 containing a supply of molten glass 12 and having an electrically heated platinum alloy bushing 14 attached to the bottom of the furnace 10. The bushing 14 is provided with a plurality of orifices in the form of tips 16, through which molten glass flows and forms small inverted cones 18. The tips are usually formed in a number of rows, for example, four to twenty or more rows, having a substantial number of tips in each row so that the total number of tips is between two hundred and four hundred or more in number.

Glass fibers 20 are drawn from the cones 18 at a very high rate of speed and are wound on a rapidly rotating forming tube 22 mounted on a winder support 24. The glass fibers 20 are grouped into a strand 26 as they pass over a gathering shoe or guide 28. A size containing a liquid binder and a lubricant is applied to the fibers preferably before they are grouped into the strand. The strand 26 passes over a suitable traversing device 30 and is wound on the forming tube 22. The forming tube 22 as it rotates provides the pulling force for attenuating the fibers from the molten glass cones 18.

FIGURE 2 illustrates in greater detail the manner in which the inverted molten glass cones are cooled. An acoustic generator 32 is spaced laterally from the electrically heated bushing 14 so that it is not subjected to the intense heat of the bushing 14 nor to the glass volatile contaminants present beneath the bushing 14. The acoustic generator 32 is preferably positioned in the same horizontal plane as the molten glass cones 18 perpendicular to the axes of the drawn fibers and is focused so that the intense acoustic field generated by the acoustic generator 32 is directed toward the molten glass cones 18.

The acoustic generator 32 may be any suitable device that is capable of generating high level acoustic power, for example, the acoustic generator 32 illustrated in FIGURE 3 is a static siren, manufactured by Acoustica Associates, Inc., Los Angeles, California, and described in U.S. Patent No. 2,755,767. The acoustic generator 32 may be driven by compressed air or any pressurized gas entering through inlet 34. In FIGURE 2 the acoustic field is indicated schematically by the vertical lines 36 which are directed toward the molten glass cones 18. The frequency of the acoustic generator to be effective must be above the audible range and preferably between 16,000 and 45,000 cycles per second. It has been found that frequency and intensity are inter-related and that for each frequency within the range given, there is a corresponding critical intensity, measured in decibels, above which substantial improvement in heat transfer occurs. The critical intensity for increased heat transfer is determined by using the equation:

$$\text{Intensity} = 136 + 10 \log_{10}\left(\frac{\text{Frequency}}{1000}\right)$$

Thus, the intensity of the acoustic field must be at least 136 decibels and above, depending upon the frequency. Without intensities above 136 decibels, increased heat transfer will not occur.

On the opposite side of furnace 10 (FIGURE 1) a sound absorption panel 38 is positioned to absorb the acoustic energy generated by the acoustic generator 32 after it has passed through the attenuation zone and provided controlled turbulence for the air surrounding the molten glass cones. A fiber glass batt is a suitable sound absorbing device which can be used to absorb the sonic energy.

The acoustic generator 32 preferably transmits the acoustic energy or vibrations in a directional pattern so that substantially only the attenuation zone is subjected to the intense acoustic field. The attenuation zone includes the molten glass cone and the portion of the fiber which has a diameter greater than the final fiber diameter. The acoustic energy is preferably focused in a direction substantially perpendicular to the axis of the cone and the fiber.

The acoustic generator 32 functions as a cooling device in the following manner. Acoustic energy in the form of controlled vibrations emanates from the acoustic generator 32 and produces an intense acoustic field schematically illustrated by the numeral 36. The acoustic field 36 is directed toward the molten glass cones 18. The acoustic field interacts with the air surrounding the molten glass cones 18 to provide a controlled turbulence to the air surrounding the molten glass cones 18. The controlled turbulence effectively increases the rate of heat transfer between the molten glass cones 18 and the surrounding air. The intense acoustic field 36 further provides a means to control the random air currents present in the vicinity of the molten glass cones 18. The random air currents are caused principally by the motion of the fiber as it is being drawn from the molten glass cones and by the heat of the electrically heated bushing 14. If it is desired to change the intensity of the intense acoustic field 36 the air or gas pressure entering the acoustic generator 32 through the conduit 34 may be regulated.

Although a single acoustic generator or sonic transducer 32 is illustrated in FIGURES 1 and 2, it should be understood that, where desired, a plurality of transducers may be employed to provide the desired degree of turbulence to the air surrounding the molten glass cones 18.

In FIGURE 3 there is illustrated another molten glass cone cooler arrangement. The construction of the fiber attenuating apparatus is identical with that shown in the other figures and all corresponding parts are given the same reference characters as in the preceding figures.

A manifold 40 is positioned in spaced lateral relation to the bushing 14 in much the same manner as the acoustic generator 32 illustrated in FIGURES 1 and 2. The manifold 40 is positioned a sufficient distance from the electrically heated bushing 14 so that it is not subjected to the intense heat of the bushing 14 nor to the glass volatile contaminants present adjacent the molten glass cones 18. An acoustic transducer schematically illustrated at 42 has a piston 44 which is positioned within the manifold 40 and is arranged to vibrate at a predetermined amplitude and provide acoustic energy in a known manner. A supply of low pressure air is provided for the manifold 40 through opening 46. The air entering manifold 40 preferably does not exceed 5 pounds per square inch and is utilized as the means to transmit the acoustic energy to the molten glass cones. The manifold 40 has a plurality of nozzles 48 (one of which is shown) which are focused in a direction toward the molten glass cones 18 so that the acoustically energized low pressure air within manifold 40 is directed through nozzle 48 to the attenuation zone which includes the molten glass cones 18. The acoustically energized air is indicated schematically by dotted lines 50. It is desirable that the acoustic energy in the acoustically energized air does not encompass the electrically heated bushing 14 since it is undesirable to extract heat therefrom. The focused acoustic stream 50 imparts controlled turbulence to the air surrounding the molten glass cones 18 and increases the rate of heat transfer between the molten glass cones 18 and the surrounding air in a manner similar to the acoustic generator 32 illustrated in FIGURES 1 and 2. The transducer 52 is constructed to control the frequency and amplitude of the acoustic stream transmitted to the air surrounding the molten glass cones 18. Although a single manifold 14 is schematically illustrated in FIGURE 3 it should be understood that a plurality of manifolds, transducers and the like can be utilized to obtain the desired cooling effect. A sound absorbing batt can be positioned on the opposite side of the furnace 10 to absorb the sonic energy in a manner similar to the sound absorbing batt 38 illustrated in FIGURE 1.

The nozzles 48 are preferably directed between the tip rows so that a small amount of cooling air is purposely introduced into the attenuation zone. The high frequency air vibrations are highly directional and the nozzles focus the air stream sharply and control the air as it moves transversely across the bushing. This controlled air stream coupled with its high level of acoustic energy serves to further stabilize ambient air conditions surrounding the molten cones of glass as well as increasing the rate of heat transfer to the surrounding air by thermo acoustic transduction.

According to the provisions of the patent statutes, the principle, preferred construction, and mode of operation of the invention have been explained, and its best embodiments have been illustrated and described.

I claim:
1. In the method of producing glass fibers from a body of molten glass wherein a portion of said molten glass is within an electrically heated bushing having orifices therein through which said molten glass flows and forms inverted molten glass cones, the glass fibers being drawn from the inverted molten glass cones, said molten glass cones being surrounded by a fluid medium in heat exchange relation therewith, said fluid medium adjacent said molten glass cones being in a relatively quiescent state, the improvement comprising, subjecting said fluid medium surrounding said molten glass cones to periodic vibrations, said vibrations being of predetermined frequency between 16,000 and 45,000 cycles per second and an intensity of 136 decibels and above to impart controlled turbulence to said fluid medium surrounding said molten glass cones, said controlled turbulence increasing the rate of heat transfer between said molten glass cones and said fluid medium.

2. In the method of producing glass fibers from a body of molten glass wherein a portion of said molten glass is within an electrically heated bushing having orifices therein through which said molten glass flows and forms inverted molten glass cones, the glass fibers being drawn from the apex of the inverted molten glass cones, said molten glass cones being surrounded by air in heat exchange relation therewith, said air adjacent said molten glass cones being in a relatively quiescent state, the improvement comprising, generating an acoustic field at a location spaced from said molten glass cones, and directing said acoustic field toward said molten glass cones, said acoustic field having a frequency of between 16,000 and 45,000 cycles per second and an intensity of 136 decibels and above imparting controlled turbulence to said air surrounding said molten glass cones to thereby increase the rate of heat transfer between said molten glass cones and said surrounding air.

3. In the method of producing glass fibers from a body of molten glass wherein a portion of said molten glass is within an electrically heated bushing having orifices therein through which said molten glass flows and forms inverted molten glass cones, the glass fibers being drawn from the apex of the inverted molten glass cones, said molten glass cones being surrounded by air in heat exchange relation therewith, said air adjacent said molten glass cones being in a relatively quiescent state, the improvement comprising, generating acoustic energy at a location spaced laterally from said electrically heated bushing and in substantially the same horizontal plane as said molten glass cones, and directing said acoustic energy as an acoustic field in a substantially horizontal direction toward said cones of molten glass, said acoustic energy imparting controlled turbulence to said air surrounding said molten glass cones to thereby increase the rate of heat transfer between said molten glass cones and said surrounding air, and controlling the frequency and intensity of said acoustic field so as to be within the range of 16,000 and 45,000 cycles per second and 136 decibels and above.

4. In the method of producing glass fibers from a body of molten glass wherein a portion of said molten glass is within an electrically heated bushing having orifices therein through which said molten glass flows and forms inverted molten glass cones, the glass fibers being drawn from the apex of the inverted molten glass cones, said molten glass cones being surrounded by air in heat exchange relation therewith, said air adjacent said molten glass cones being in a relatively quiescent state, the improvement comprising, positioning a manifold in spaced relation to said electrically heated bushing, feeding air at a low pressure to said manifold, subjecting said air within said manifold to controlled vibrations of between 16,000 and 45,000 cycles per second with an intensity of 136 decibels and above, directing said subjected air toward said molten glass cones as a focused acoustic stream, said acoustic stream imparting controlled turbulence to said air surrounding said molten glass cones to thereby increase the rate of heat transfer between said molten glass cones and said surrounding air.

References Cited by the Examiner

UNITED STATES PATENTS

| 1,488,565 | 4/1924 | Stewart et al. | 181—69 |
| 3,150,946 | 9/1964 | Russell | 65—2 |

FOREIGN PATENTS

| 460,795 | 2/1937 | Great Britain. |
| 530,468 | 12/1940 | Great Britain. |

OTHER REFERENCES

Lemlich: "Vibration and Pulsation Boost Heat Transfer," Chemical Engineering, May 15, 1961, pp. 171–176.

DONALL H. SYLVESTER, *Primary Examiner.*

S. LEON BASHORE, G. R. MYERS,
*Assistant Examiners.*